United States Patent
Inoh (10) Patent No.: US 8,619,214 B2
(45) Date of Patent: Dec. 31, 2013

(54) LIQUID CRYSTAL DISPLAY DEVICE AND METHOD FOR DRIVING THE SAME

(75) Inventor: Ippei Inoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 379 days.

(21) Appl. No.: 12/920,300

(22) PCT Filed: Jan. 7, 2009

(86) PCT No.: PCT/JP2009/000034
§ 371 (c)(1),
(2), (4) Date: Apr. 14, 2011

(87) PCT Pub. No.: WO2009/122630
PCT Pub. Date: Oct. 8, 2009

(65) Prior Publication Data
US 2011/0181803 A1   Jul. 28, 2011

(30) Foreign Application Priority Data
Mar. 31, 2008 (JP) ................... 2008-089584

(51) Int. Cl.
G02F 1/1333 (2006.01)
G02F 1/1335 (2006.01)
G02F 1/1343 (2006.01)

(52) U.S. Cl.
USPC ................. 349/86; 349/74; 349/115

(58) Field of Classification Search
USPC .............. 349/74, 115, 86, 141, 149
See application file for complete search history.

(56) References Cited

U.S. PATENT DOCUMENTS

| | | | |
|---|---|---|---|
| 5,796,447 A * | 8/1998 | Okumura et al. | 349/33 |
| 6,307,605 B1 * | 10/2001 | Bailey | 349/84 |
| 6,580,482 B1 | 6/2003 | Hiji et al. | |
| 6,697,039 B1 | 2/2004 | Yamakawa et al. | |
| 2001/0028421 A1 * | 10/2001 | Masazumi et al. | 349/74 |
| 2003/0197820 A1 | 10/2003 | Hiji et al. | |
| 2006/0262260 A1 * | 11/2006 | Majumdar et al. | 349/122 |
| 2008/0024854 A1 * | 1/2008 | Izumi et al. | 359/245 |
| 2008/0239174 A1 * | 10/2008 | Ishii et al. | 349/12 |

FOREIGN PATENT DOCUMENTS

| | | |
|---|---|---|
| JP | 10-31210 A | 2/1998 |
| JP | 10-48661 A | 2/1998 |
| JP | 11-24090 A | 1/1999 |
| JP | 11-352518 A | 12/1999 |
| JP | 2000-147547 A | 5/2000 |
| JP | 2000-352704 A | 12/2000 |
| JP | 2001-281621 A | 10/2001 |
| JP | 2002-62540 A | 2/2002 |
| JP | 2006-58614 A | 3/2006 |
| JP | 2006-133645 A | 5/2006 |
| JP | 2006-171518 A | 6/2006 |
| JP | 2007-193307 A | 8/2007 |

OTHER PUBLICATIONS

Shiyanovskaya et al., "Single Substrate Coatable Multicolor Cholesteric Liquid Crystal Displays", SID 07 DIGEST 65, pp. 65-68, ISSN/007-0966X/07/3801-0065.

* cited by examiner

*Primary Examiner* — Jessica M Merlin
(74) *Attorney, Agent, or Firm* — Birch, Stewart, Kolasch & Birch, LLP (57) ABSTRACT

An LCD device includes a transparent substrate. A first data electrode, a first CLC-MC layer, a first selection electrode, a second CLC-MC layer, a second data electrode, an insulating layer, a second selection electrode, a third CLC-MC layer, and a third data electrode are sequentially formed in this order on the transparent substrate.

21 Claims, 7 Drawing Sheets

LIQUID CRYSTAL DISPLAY DEVICE AND METHOD FOR DRIVING THE SAME

TECHNICAL FIELD

The present invention relates to liquid crystal display (LCD) devices and methods for driving the same.

BACKGROUND ART

Liquid crystal is liquid at room temperature. Thus, a liquid crystal layer having a laminated structure is typically formed by forming a plurality of members, each having liquid crystal interposed between transparent substrates such as glass or plastic which have transparent electrodes formed on their surfaces, and then laminating the plurality of members together.

However, in the above configuration, the transparent substrates for interposing the liquid crystal therebetween cause parallax, which degrades display characteristics.

In order to reduce the parallax, ultrathin substrates such as plastic films can be used to interpose liquid crystal therebetween. However, this reduces dimensional accuracy of the substrates, which tends to cause misalignment of the liquid crystal layer. Thus, desired colors cannot be displayed in the entire display region.

As a solution to this problem have been studied and developed liquid crystal layers that are formed by laminating together a plurality of layers (hereinafter referred to as CLC-MC layers) each formed by microcapsules (MC) containing cholesteric liquid crystal (CLC). Such a liquid crystal layer having a laminated structure of a plurality of CLC-MC layers can eliminate the transparent substrates in the liquid crystal layer, and thus causes no parallax. Moreover, since the plurality of CLC-MC layers can be formed on a single substrate, no display defect occurs due to the above dimensional accuracy of the substrates.

Such LCD devices having a liquid crystal layer formed by laminating CLC-MC layers are disclosed in, e.g., Non-Patent Document 1, Patent Document 1, and the like. Non-Patent Document 1 and Patent Document 1 describe LCD devices having a liquid crystal layer formed by laminating three CLC-MC layers.

Figure 11:
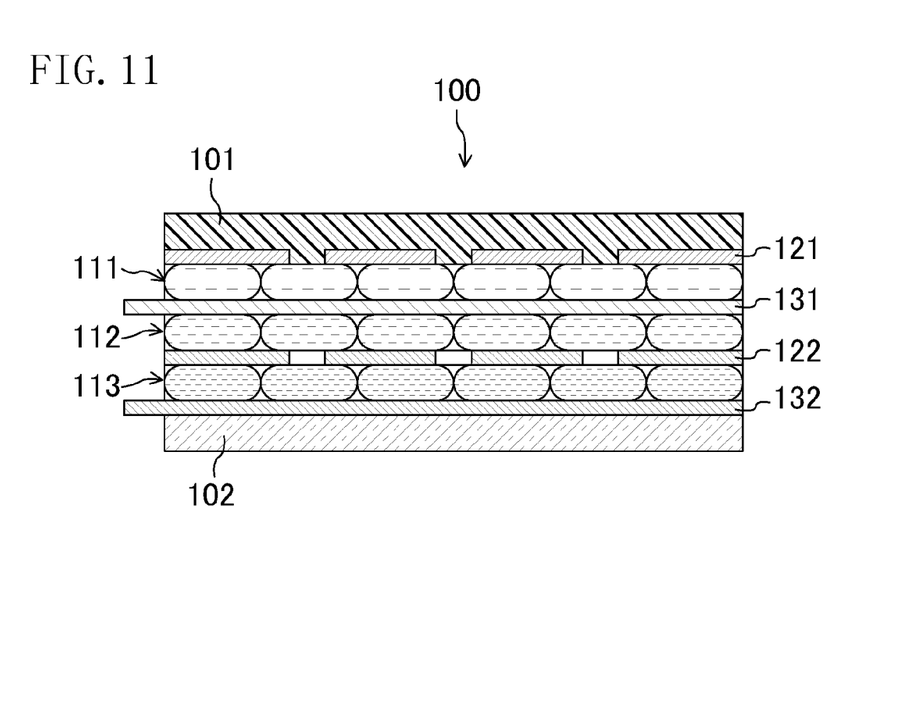
FIG. 11 is a cross-sectional view of a conventional LCD device having a liquid crystal layer formed by laminating three CLC-MC layers.

FIG. 11 shows a cross-sectional view of a conventional LCD device 100 having a liquid crystal layer formed by laminating three CLC-MC layers as disclosed in Non-Patent Document 1 and the like.

The LCD device 100 includes a first substrate 101 and a second substrate 102, each formed by a transparent insulting substrate, and a liquid crystal layer having a three-layer (first to third CLC-MC layers 111-113) structure, which is interposed between the first substrate 101 and the second substrate 102. More specifically, a first data electrode 121, the first CLC-MC layer 111, a first selection electrode 131, the second CLC-MC layer 112, a second data electrode 122, the third CLC-MC layer 113, a second selection electrode 132, and the second substrate 102 are sequentially formed in this order on the first substrate 101.

CITATION LIST

Non-Patent Document

NON-PATENT DOCUMENT 1: I. Shiyanovskaya, and eight others, "Single Substrate Coatable Multicolor Cholesteric Liquid Crystal Displays," SID 07 DIGEST 65

Patent Document

PATENT DOCUMENT 1: Japanese Published Patent Application No. 2006-171518

SUMMARY OF THE INVENTION

Technical Problem

In such a conventional liquid crystal layer having the three-layer structure of the CLC-MC layers, the third CLC-MC layer 113 is driven by the second data electrode 122 and the second selection electrode 132. If a signal voltage for the second CLC-MC layer 112 is applied to the second data electrode 122, the third CLC-MC layer 113 is driven by the data signal voltage for the second CLC-MC layer 112 even if the second selection electrode 132 is in a floating state. This causes display defects such as an unintended display state.

The present invention was developed in view of the above problem, and it is an object of the present invention to provide an LCD device having a laminated structure of CLC-MC layers and having satisfactory display quality, and a method for driving the same.

Solution to the Problem

An LCD device according to the present invention is an LCD device including: a liquid crystal layer formed by laminating a plurality of layers (hereinafter referred to as CLC-MC layers) each formed by microcapsules containing cholesteric liquid crystal; and a transparent substrate, wherein a first data electrode, a first CLC-MC layer, a first selection electrode, a second CLC-MC layer, a second data electrode, an intermediate layer, a second selection electrode, a third CLC-MC layer, and a third data electrode are sequentially formed in this order on the transparent substrate.

With the above configuration, the third CLC-MC layer is interposed between the second selection electrode and the third data electrode, and a voltage is applied to the third CLC-MC layer by these electrodes. Thus, the third CLC-MC layer is not driven by a data signal voltage for the second CLC-MC layer, which can satisfactorily reduce display defects such as an unintended display state. Since each of the first to third CLC-MC layers contains the liquid crystal in the microcapsules, no transparent substrate or the like need be provided between the layers, whereby the possibility that parallax may be caused can be satisfactorily reduced. Moreover, since all the layers are laminated on the single transparent substrate, display defects due to dimensional accuracy of the substrate can be prevented.

According to the LCD device of the present invention, of the first to third CLC-MC layers, the first CLC-MC layer may have a shortest selective reflection wavelength and selectively reflect blue light, the second CLC-MC layer may have a second shortest selective reflection wavelength and selectively reflect green light, and the third CLC-MC layer may have a longest selective reflection wavelength and selectively reflect red light, and the intermediate layer may be an insulating layer that transmits light from the third CLC-MC layer therethrough, and does not transmit light from the second CLC-MC layer therethrough.

With the above configuration, since the CLC-MC layer, which has the shortest selective reflection wavelength and selectively reflects blue light, is provided on the transparent substrate side, the viewer views the LCD device from the transparent substrate side. When the viewer views the LCD device from the transparent substrate side, the third CLC-MC layer, which is provided over the transparent substrate, and which has the longest selective reflection wavelength and selectively reflects red light, is positioned farthest from the viewer, whereby display quality is increased. The principles of this will be specifically described below.

Cholesteric liquid crystal slightly scatters light when in a focal conic state. The degree of such light scattering increases as the chiral pitch increases. This may be because the focal conic domain size increases as the selective reflection wavelength increases. Thus, if a cholesteric liquid crystal layer, which has a shorter selective reflection wavelength and thus scatters light to a lesser degree in the focal conic state, is provided on the viewer side, this cholesteric liquid crystal layer, when in the focal conic state, reduces scattering of light that is selectively reflected from a lower cholesteric liquid crystal layer having a longer selective reflection wavelength when this lower cholesteric liquid crystal layer is in a planar state. This can increase the intensity of the selectively reflected light of the lower cholesteric liquid crystal layer, thereby increasing color purity. On the other hand, if a cholesteric liquid crystal layer having a longer selective reflection wavelength is provided on the viewer side, this cholesteric liquid crystal layer, when in the focal conic state, scatters light that is used for selective reflection by a lower cholesteric liquid crystal layer having a shorter selective reflection wavelength when this lower cholesteric liquid crystal layer is in the planar state. This reduces light utilization efficiency, thereby reducing the color purity.

Since the insulating layer, which transmits light from the third CLC-MC layer therethrough and does not transmit light from the second CLC-MC layer therethrough, is formed between the second data electrode and the second selection electrode, red color purity can be increased by providing a red reflecting layer as the third CLC-MC layer.

According to the LCD device of the present invention, the first selection electrode and the second selection electrode may be electrically connected to one drive IC, and the first to third data electrodes may be electrically connected to different drive ICs.

With the above configuration, since the first selection electrode and the second selection electrode are electrically connected to one drive IC, manufacturing efficiency of the LCD device is increased, and manufacturing cost thereof is reduced, and also the area for placing ICs can be reduced. Moreover, since a drawing process of the first to third CLC-MC layers can be performed at a time by linear sequential driving, the time it takes to draw the screen of the LCD device is reduced accordingly.

According to the LCD device of the present invention, the intermediate layer may be a second' CLC-MC layer that has a same selective reflection wavelength as that of the second CLC-MC layer, and rotates a plane of polarization of selectively reflected light in a direction opposite to that of the second CLC-MC layer.

With the above configuration, the second' CLC-MC layer, which has the same selective reflection wavelength as that of the second CLC-MC layer and rotates the plane of polarization of selectively reflected light in the direction opposite to that of the second CLC-MC layer, is located behind the second CLC-MC layer as viewed from the viewer side. Thus, an LCD device having more satisfactory light reflectance can be obtained.

According to the LCD device of the present invention, the second selection electrode may be a red light transmitting electrode.

With the above configuration, since the second selection electrode is a red light transmitting electrode, color purity of the third CLC-MC layer is increased.

According to the LCD device of the present invention, the second selection electrode may be made of a transparent conductive polymer material having a red dye dispersed therein.

With the above configuration, since the second selection electrode is made of a transparent conductive polymer material having a red dye dispersed therein, the second selection electrode can be formed as the red light transmitting electrode by a smaller number of manufacturing steps. This increases manufacturing efficiency, and reduces satisfactory manufacturing cost.

According to the LCD device of the present invention, the second selection electrode may be formed by interposing a resin, which has a red dye dispersed therein, between layers of a transparent conductive polymer material.

The above configuration increases the number of types of red dyes that can be used, thereby facilitating selection of the red dye.

According to the LCD device of the present invention, each of the first and second selection electrodes may be formed by stripe electrodes so that the stripe electrodes of the first and second electrodes extend in a same direction, and each of the first to third data electrodes may be formed by stripe electrodes so that the stripe electrodes of the first to third data electrodes extend in a same direction that crosses the first and second selection electrodes.

The above configuration facilitates designation of coordinates of pixels that are formed at intersections of the first to third data electrodes, and the first and second selection electrodes.

According to the LCD device of the present invention, the cholesteric liquid crystal of each of the first to third CLC-MC layers may have positive dielectric anisotropy.

With the above configuration, the cholesteric liquid crystal of each of the first to third CLC-MC layers has positive dielectric anisotropy. Thus, when a pulse voltage is applied, the cholesteric liquid crystal is homeotropically aligned so that the major axes of liquid crystal molecules extend in the thickness direction of the liquid crystal layer (the direction in which the voltage is applied). When no pulse voltage is applied, the major axes of the liquid crystal molecules extend vertically to the thickness direction of the liquid crystal layer. This facilitates switching of the cholesteric liquid crystal between the planar state and the focal conic state by application of a voltage.

According to the LCD device of the present invention, the transparent substrate may be a plastic substrate.

With the above configuration, since the transparent substrate is a plastic substrate, the weight of the LCD device can be reduced.

According to the LCD device of the present invention, the first data electrode may be made of an inorganic transparent conductive material.

With the above configuration, since the first data electrode is made of an inorganic transparent conductive material, reliability of connection with the drive IC is increased.

According to the LCD device of the present invention, each of the first and second selection electrodes and the second and third data electrodes may be made of a conductive polymer material.

With the above configuration, since each of the first and second selection electrodes and the second and third data electrodes is made of a conductive polymer material, these electrodes can be easily formed at low cost by a printing method.

According to the LCD device of the present invention, the third data electrode may be made of carbon black.

With the above configuration, since the third data electrode is made of carbon black, the LCD device can easily provide black display when all of the first to third CLC-MC layers are in the focal conic state.

According to the LCD device of the present invention, the third data electrode may be covered by a protective film.

With the above configuration, since the third data electrode is covered by a protective film, damage to the third data electrode due to contact from the outside or the like can be effectively reduced.

According to the LCD device of the present invention, the protective film may be made of a black material.

With the above configuration, since the protective film is made of a black material, a black layer, which is required for black display of the LCD device, can be formed by the protective film. This can reduce the number of materials accordingly, thereby reducing manufacturing cost, and increasing manufacturing efficiency.

According to the LCD device of the present invention, the protective film may have a black paint applied to its surface.

With the above configuration, since the black paint is applied to the surface of the protective film, the protection effect of the protective film is enhanced.

According to the LCD device of the present invention, the protective film may have a black film provided on its surface.

With the above configuration, since the black film is provided on the surface of the protective film, the protection effect of the protective film is enhanced.

According to the LCD device of the present invention, the protective film may be dark blue, and may have a black paint applied to its surface.

Red light that is incident on the third CLC-MC layer is slightly scattered (forward scattered, refracted) when the third CLC-MC layer is in the focal conic state. With the above configuration of the invention, this scattered light is reflected by the protective film having the black paint applied thereto, and the reflected light has a mixed color of black and red (dark brown, chocolate brown). However, since the protective film is dark blue, the protective film absorbs the slightly scattered red light, whereby black color purity is increased, and the contrast ratio is also increased.

According to the LCD device of the present invention, the protective film may be dark blue, and may have a black film provided on its surface.

With the above configuration, the black color purity of the LCD device is increased, and the contrast ratio is also increased, as described above.

According to the LCD device of the present invention, the first selection electrode may be made of green polyaniline.

With the above configuration, since the first selection electrode is made of green polyaniline, green color purity is increased when the second CLC-MC layer selectively reflects green light.

A method for driving an LCD device according to the present invention is a method for driving the LCD device having the above configuration, where when no voltage is applied to the first to third CLC-MC layers, the cholesteric liquid crystal contained in the microcapsules is in a planar state and in a focal conic state, the method including: applying a voltage to switch the cholesteric liquid crystal contained in the microcapsules between the planar state and the focal conic state.

With the above configuration, since no voltage is applied except when rewriting display data, power consumption for driving the LCD device can be reduced.

According to the method of the present invention, the cholesteric liquid crystal contained in the microcapsules in the first CLC-MC layer may be switched between the planar state and the focal conic state by a voltage applied from the first data electrode and the first selection electrode, the cholesteric liquid crystal contained in the microcapsules in the second CLC-MC layer may be switched between the planar state and the focal conic state by a voltage applied from the second data electrode and the first selection electrode, and the cholesteric liquid crystal contained in the microcapsules in the third CLC-MC layer may be switched between the planar state and the focal conic state by a voltage applied from the third data electrode and the second selection electrode.

With the above configuration, since a voltage is applied to the third CLC-MC layer by the second selection electrode and the third data electrode, the third CLC-MC layer is not driven by a data signal voltage for the second CLC-MC layer, whereby display defects such as an unintended display state can be satisfactorily reduced.

According to the method of the present invention, the applied voltage may be a bipolar pulse voltage.

With the above configuration, since the applied voltage is a bipolar pulse voltage, electrolysis of a liquid crystal material by a direct current (DC) component of a current can be satisfactorily reduced.

Advantages of the Invention

An LCD device having a laminated structure of CLC-MC layers and having satisfactory display quality, and a method for driving the same can be provided according to the present invention.

DESCRIPTION OF REFERENCE CHARACTERS

10 LCD Device
11 Transparent Substrate (Insulating Substrate)

14 Insulating Layer (Intermediate Layer)
16 Protective Film
17 Drive IC
21 First Data Electrode
22 Second Data Electrode
23 Third Data Electrode
31 First CLC-MC Layer
32 Second CLC-MC Layer
32' Second' CLC-MC Layer
33 Third CLC-MC Layer
41 First Selection Electrode
42 Second Selection Electrode
51, 52, 52', 53 Microcapsule
70 LCD Device

DESCRIPTION OF EMBODIMENTS

LCD devices and driving methods thereof according to embodiments of the present invention will be described in detail below with reference to the accompanying drawings. Note that the present invention is not limited to the following embodiments.

First Embodiment (Configuration of LCD Device 10)

Figure 1:
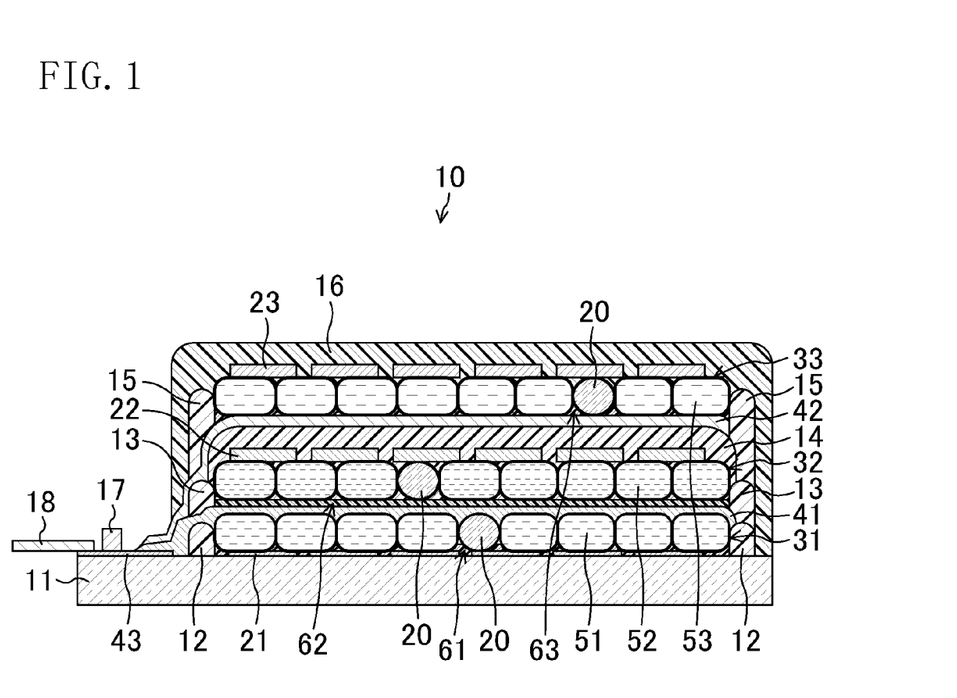
FIG. 1 is a cross-sectional view of an LCD device according to a first embodiment of the present invention.

FIG. 1 is a cross-sectional view of an LCD device 10 according to a first embodiment of the present invention. The LCD device 10 includes a transparent substrate 11 made of glass, plastic, or the like. A first data electrode 21, which is formed by a plurality of stripe electrodes, is formed on the transparent substrate 11. A bank 12 is formed around the first data electrode 21 on the transparent substrate 11. A first CLC-MC layer 31 is formed in a region surrounded by the bank 12 on the first data electrode 21. A first selection electrode 41 is formed on the first CLC-MC layer 31. The first selection electrode 41 is formed by a plurality of stripe electrodes extending in a direction crossing the first data electrode 21. A bank 13 is formed around the first selection electrode 41. A second CLC-MC layer 32 is formed in a region surrounded by the bank 13 on the first selection electrode 41. A second data electrode 22 is formed on the second CLC-MC layer 32. The second data electrode 22 is formed by a plurality of stripe electrodes extending in the same direction as that of the first data electrode 21. An insulating layer 14 is formed on the second data electrode 22. A second selection electrode 42 is formed on the insulating layer 14. A bank 15 is formed around the second selection electrode 42. A third CLC-MC layer 33 is formed in a region surrounded by the bank 15 on the second selection electrode 42. A third data electrode 23 is formed on the third CLC-MC layer 33. The third data electrode 23 is formed by a plurality of stripe electrodes extending in the same direction as that of the first and second electrodes 21, 22. A protective film 16 is formed on the third data electrode 23.

Each of the first to third CLC-MC layers 31, 32, 33 is formed by a plurality of microcapsules 51, 52, 53 containing cholesteric liquid crystal having positive dielectric anisotropy. The microcapsules 51, 52, 53 can be made of, e.g., a resin material such as polyisocyanate. Of the first to third CLC-MC layers 31, 32, 33, the first CLC-MC layer 31 includes cholesteric liquid crystal that has the shortest selective reflection wavelength, and selectively reflects blue light. The second CLC-MC layer 32 includes cholesteric liquid crystal that has the second shortest selective reflection wavelength, and selectively reflects green light. The third CLC-MC layer 33 includes cholesteric liquid crystal that has the longest selective reflection wavelength, and selectively reflects red light. The cholesteric liquid crystal of the first to third CLC-MC layers 31, 32, 33 has a selective reflection peak wavelength of 480 nm, 550 nm, and 640 nm, respectively.

Figure 2:
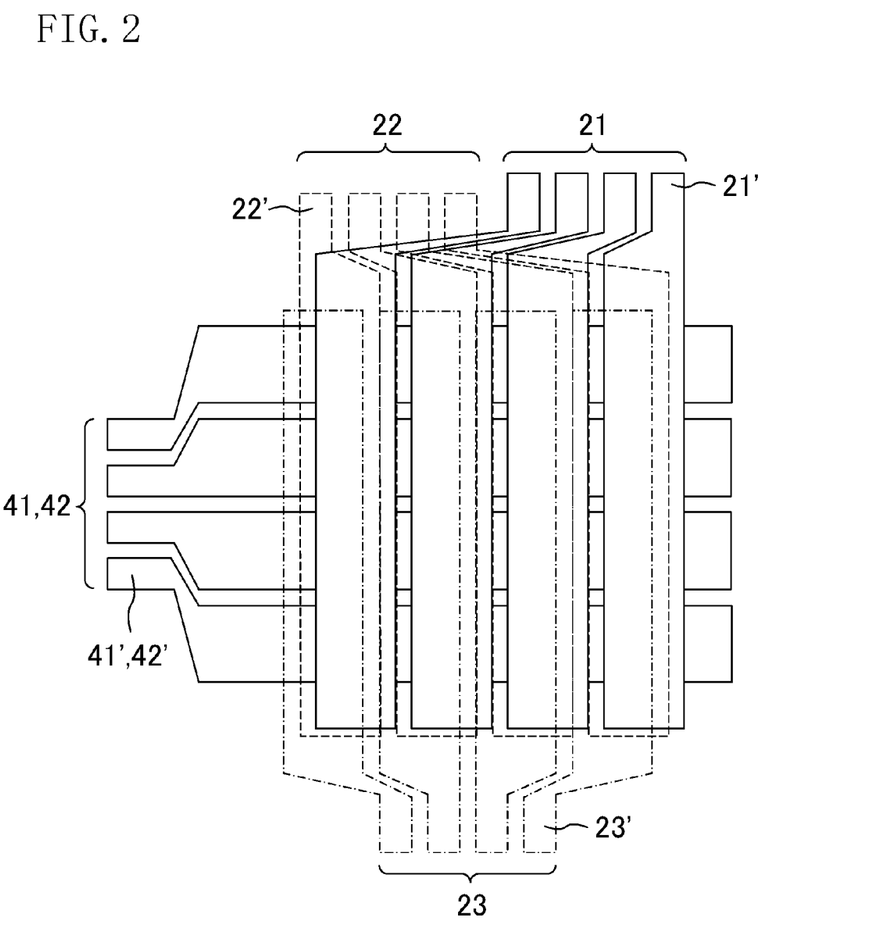
FIG. 2 is a plan view of the arrangement of electrodes of the LCD device.

FIG. 2 is a plan view of the arrangement of the electrodes of the LCD device 10. As shown in FIG. 2, the first and second data electrodes 21, 22 have extended portions 21', 22' that extend in the same direction. The extended portions 21', 22' are electrically connected together via a common line, not shown. One drive integrated circuit (IC), not shown, for driving the first and second data electrodes 21, 22 is electrically connected to the common line.

An extended portion 23' of the third data electrode 23 is formed to extend on the side opposite to the extended portions 21', 22' of the first and second data electrodes 21, 22, and a drive IC, not shown, is electrically connected to the extended portion 23'.

The first and second selection electrodes 41, 42 have extended portions 41', 42' that extend in the same direction. The extended portions 41', 42' are electrically connected together via a common line 43. A drive IC 17 for driving the first and second selection electrodes 41, 42 and a connection circuit 18 are electrically connected to the common line 43.

Materials of the electrodes are not specifically limited. The first data electrode 21 is preferably made of, e.g., an inorganic transparent conductive material such as indium tin oxide (ITO) or indium zinc oxide (IZO). Each of the first and second selection electrodes 41, 42 and the second and third data electrodes 22, 23 is preferably made of, e.g., a conductive polymer material such as polyacetylene, polyparaphenylene, polyaniline, polythiophene, or polyparaphenylene vinylene. The third data electrode 23 is preferably made of carbon black, and the first selection electrode 41 is preferably made of green polyaniline.

Figure 3:
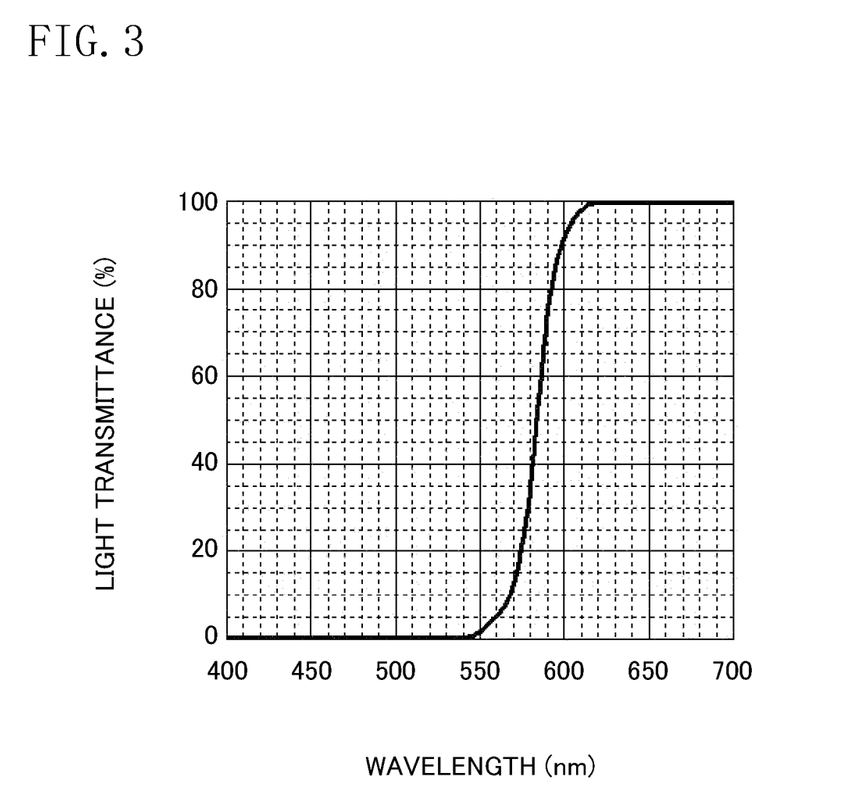
FIG. 3 is a graph showing the light transmittance of an insulating layer.

The insulating layer 14 transmits light from the third CLC-MC layer 33 therethrough, and does not transmit light from the second CLC-MC layer 32 therethrough. More specifically, the insulating layer 14 is formed as a colored insulating layer having such light transmittance as shown in FIG. 3. The insulating layer 14 is made of a resin mixed with a dye that blocks light having a wavelength of 600 nm or less (e.g., an acrylic clear red paint or the like). The material of the insulating layer 14 is not limited to this, and may be, e.g., an epoxy resin mixed with the dye, an ultraviolet (UV) curable resin mixed with the dye, or the like. For example, a porphyrin dye is preferably used as the dye that is mixed with the resin.

The protective film 16 is made of, e.g., an epoxy resin, a urethane resin, or the like. The protective film 16 may be made of a resin containing a black material. The protective film 16 may be made of a resin having a black paint applied to its surface, or a resin having a black film provided on its surface.

The protective film 16 may be made of a dark blue resin having a black paint applied to its surface, or a dark blue resin having a black film provided on its surface. For example, a resin that contains as a colorant a mixture of phthalocyanine blue and red iron oxide may be used as the dark blue resin. The amount of colorant to be added to the resin is not specifically limited as it varies depending on the type of the resin and the level of coloring. However, it is typically preferable to add 1 to 50 mass % of the colorant to the resin.

(Manufacturing Method of LCD Device 10)

A manufacturing method of the LCD device 10 according to the first embodiment of the present invention will be described below. Note that the manufacturing method described below is by way of example only, and the LCD device 10 of the present invention is not limited to LCD devices that are manufactured by the method described below.

Figure 4:
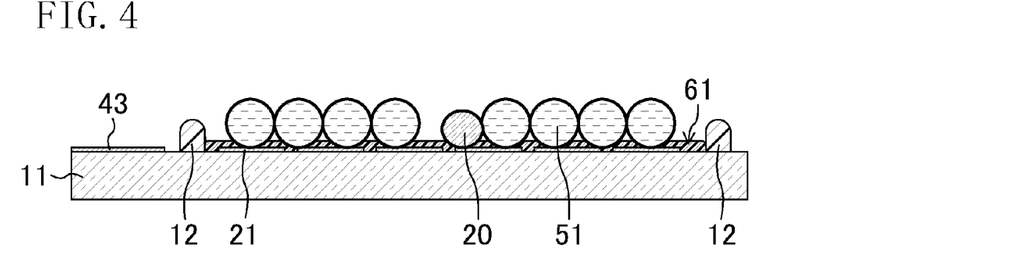
FIG. 4 is a cross-sectional view of a transparent substrate having microcapsules temporarily fixed to a first data electrode by allowing microcapsule slurry to air dry.

First, as shown in FIG. 4, a transparent substrate 11 such as glass is prepared, and ITO, for example, is formed on the transparent substrate 11 by a sputtering method. Then, the ITO is patterned by a photolithography method to form a first data electrode 21 and a common line 43.

In a step separate from that described above, three types of microcapsules 51, 52, 53 are prepared, which have walls made of, e.g., polyisocyanate, and contain three types of cholesteric liquid crystal having a selective reflection peak wavelength of 480 nm, 550 nm, and 640 nm, respectively. The microcapsules 51, 52, 53 have a particle size of about 10±5 µm. Then, 20 mass % of each type of microcapsules 51, 52, 53 is developed in a 0.5% aqueous solution of a water-soluble photocurable resin, and 0.5 mass % of spherical glass beads 20 having a particle size of about 5 µm is mixed with the resultant solution. Three types of microcapsule slurry 61, 62, 63 (mixed solutions) are prepared in this manner.

Then, a bank 12, which is made of an epoxy resin or the like, is formed around the first data electrode 21 on the transparent substrate 11 by a screen printing method, and the microcapsule slurry 61, which includes the microcapsules 51 containing the cholesteric liquid crystal having a selective reflection peak wavelength of 480 nm, is developed in a region surrounded by the bank 12. The resultant transparent substrate 11 is then left in a horizontal position to allow the microcapsule slurry 61 to air dry. At this time, the bank 12 serves to prevent leakage of the microcapsule slurry 61. Note that the bank 12 may be drawn by a dispenser.

The dried microcapsule slurry 61 forms a water-soluble photocurable resin film on the transparent substrate 11 and the first data electrode 21, and the microcapsules 51 are temporarily fixed by the water-soluble photocurable resin film as the water-soluble photocurable resin film serves as an adhesive member.

Figure 5:
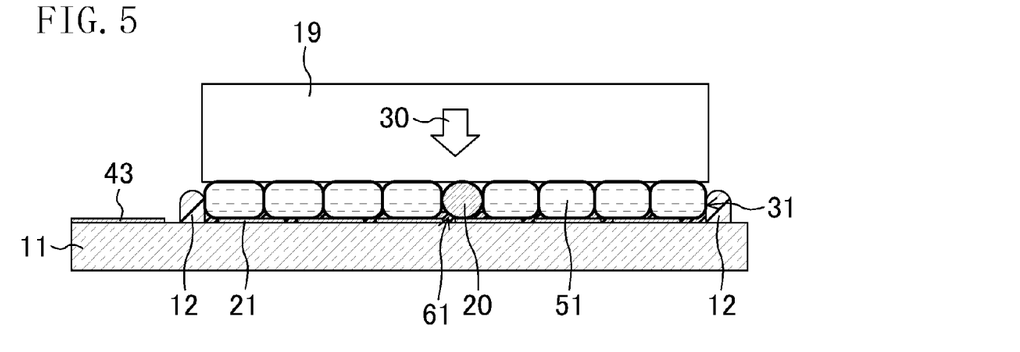
FIG. 5 is a diagram showing how the microcapsules on the first electrode are pressed by a glass stamper.

Thereafter, as shown in FIG. 5, the microcapsules 51 are pressed and deformed at 1 kg/cm$^2$ by a glass stamper 19 having a mirror-polished pressing surface, and then the transparent substrate 11 having the water-soluble photocurable resin film formed thereon is irradiated with UV light 30 having a wavelength of 365 nm at 500 mJ/cm$^2$ through the glass stamper 19. Thus, each of the plurality of microcapsules 51 is fixed in the deformed shape, namely substantially in the shape of a rectangular parallelepiped, whereby a first CLC-MC layer 31 is completed. At this time, the plurality of microcapsules 51 of the first CLC-MC layer 31 are arranged in a close-packed structure, and thus the LCD device 10 has a satisfactory aperture ratio.

Since the water-soluble photocurable resin is photo-cured, the cured water-soluble photocurable resin fills small gaps in the first CLC-MC layer 31, thereby insulating the first data electrode 21 from a first selection electrode 41 to be formed on the first CLC-MC layer 31.

Next, for example, a conductive polymer such as polythiophene is printed with a thickness of about 1.5 µm on the first CLC-MC layer 31 to form the first selection electrode 41. Note that the first selection electrode 41 may be formed by an inkjet method.

Figure 6:
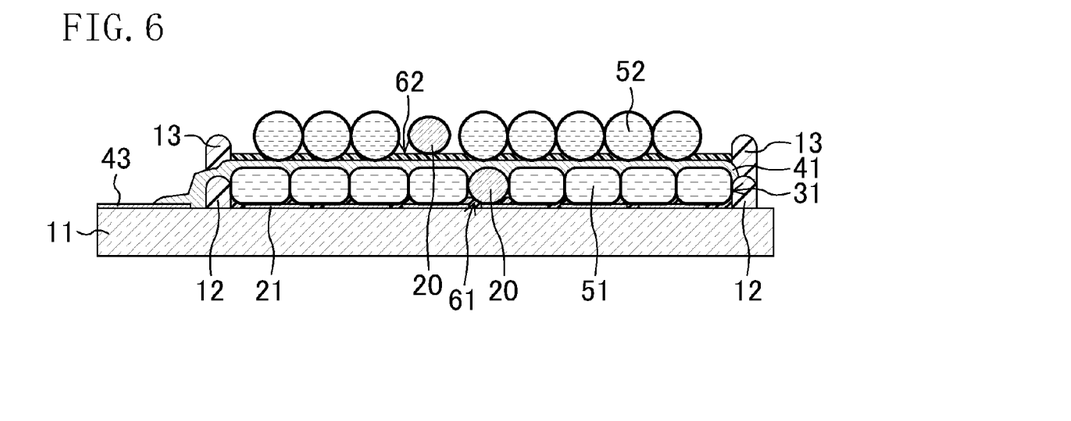
FIG. 6 is a cross-sectional view of the transparent substrate having microcapsules temporarily fixed to a first selection electrode by allowing microcapsule slurry to air dry.

Then, a bank 13, which is made of an epoxy resin or the like, is formed around the first selection electrode 41 by a screen printing method, and the microcapsule slurry 62, which includes the microcapsule capsules 52 containing the cholesteric liquid crystal having a selective reflection peak wavelength of 550 nm, is developed in a region surrounded by the bank 13. The resultant transparent substrate 11 is left in a horizontal position to allow the microcapsule slurry 62 to air dry. Note that the bank 13 may be drawn by a dispenser.

As shown in FIG. 6, the dried microcapsule slurry 62 forms a water-soluble photocurable resin film on the first selection electrode 41, and the microcapsules 52 are temporarily fixed by the water-soluble photocurable resin film.

Figure 7:
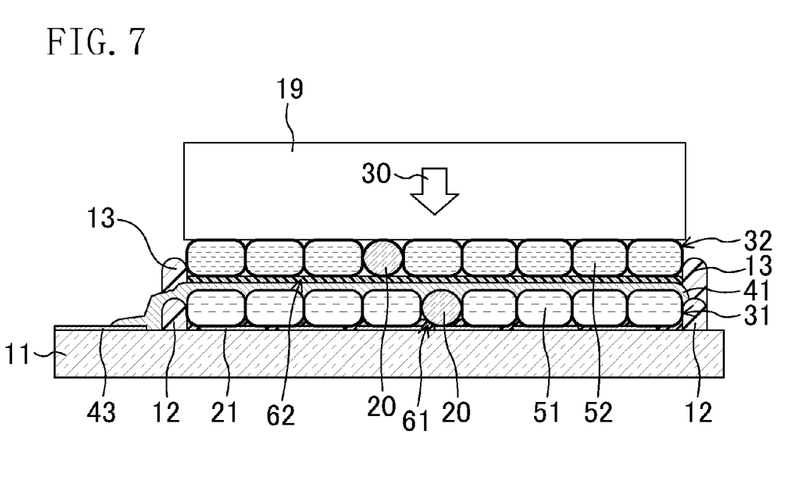
FIG. 7 is a diagram showing how the microcapsules on the first selection electrode are pressed by the glass stamper.

Thereafter, as shown in FIG. 7, the microcapsules 52 are pressed and deformed at 1 kg/cm$^2$ by the glass stamper 19 having the mirror-polished pressing surface, and then the transparent substrate 11 having the water-soluble photocurable resin film formed thereon is irradiated with UV light 30 having a wavelength of 365 nm at 500 mJ/cm$^2$ through the glass stamper 19. Thus, each of the plurality of microcapsules 52 is fixed in the deformed shape, namely substantially in the shape of a rectangular parallelepiped, whereby a second CLC-MC layer 32 is completed. At this time, the plurality of microcapsules 52 of the second CLC-MC layer 32 are arranged in a close-packed structure, and thus the LCD device 10 has a satisfactory aperture ratio.

Since the water-soluble photocurable resin is photo-cured, the cured water-soluble photocurable resin fills small gaps in the second CLC-MC layer 32, thereby insulating the first data electrode 21 from a second data electrode 22 to be formed on the second CLC-MC layer 32.

Then, for example, a conductive polymer such as polythiophene is printed with a thickness of about 1.5 µm on the second CLC-MC layer 32 to form the second data electrode 22. Note that the second data electrode 22 may be formed by an inkjet method.

Figure 8:
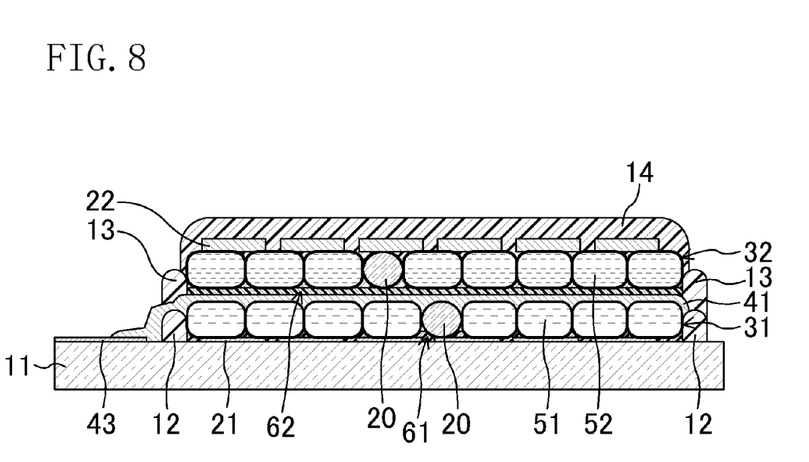
FIG. 8 is a cross-sectional view of the transparent substrate having an insulating film formed thereon.

Subsequently, as shown in FIG. 8, an insulating layer 14 is formed on the second data electrode 22. The insulating layer 14 is formed by a tampo printing method by using a UV curable resin, such as a resin mixed with a dye that blocks light having a wavelength of 600 nm or less (such as e.g., an acrylic clear red paint or the like), or an epoxy resin mixed with the dye. Note that the insulating layer 14 may be formed by a flexo printing method, a screen printing method, an inkjet method, or the like.

Then, for example, a conductive polymer such as polythiophene is printed with a thickness of about 1.5 µm on the insulating film 14 to form a second selection electrode 42. Note that the second selection electrode 42 may be formed by an inkjet method.

Figure 9:
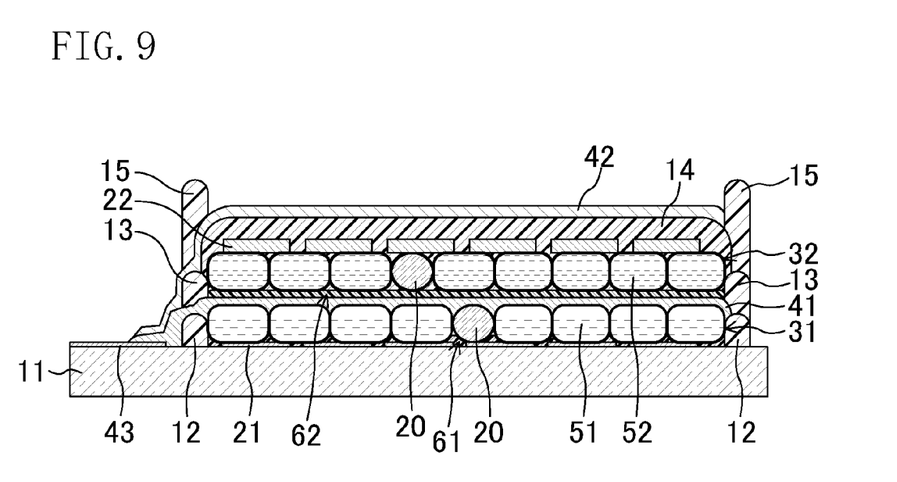
FIG. 9 is a cross-sectional view of the transparent substrate having a bank formed around a second selection electrode.

Then, as shown in FIG. 9, a bank 15, which is made of an epoxy resin or the like, is formed around the second selection electrode 42 by a screen printing method, and the microcapsule slurry 63, which includes the microcapsule capsules 53 containing the cholesteric liquid crystal having a selective reflection peak wavelength of 640 nm, is developed in a region surrounded by the bank 15. The resultant transparent substrate 11 is left in a horizontal position to allow the microcapsule slurry 63 to air dry. Note that the bank 15 may be drawn by a dispenser.

The dried microcapsule slurry 63 forms a water-soluble photocurable resin film on the second selection electrode 42, and the microcapsules 53 are temporarily fixed by the water-soluble photocurable resin film.

Figure 10:
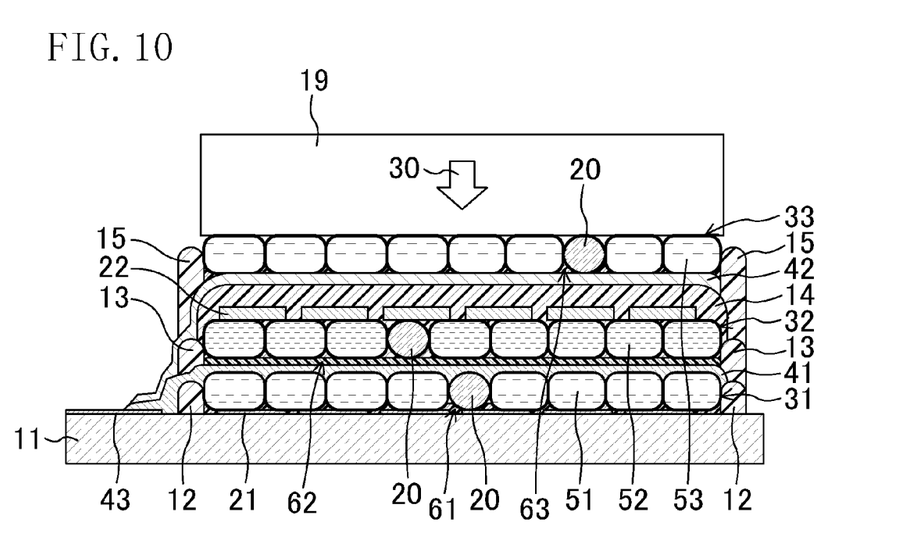
FIG. 10 is a diagram showing how microcapsules on the second selection electrode are pressed by the glass stamper.

Thereafter, as shown in FIG. 10, the microcapsules 53 are pressed and deformed at 1 kg/cm$^2$ by the glass stamper 19 having the mirror-polished pressing surface, and then the transparent substrate 11 having the water-soluble photocurable resin film formed thereon is irradiated with UV light 30 having a wavelength of 365 nm at 500 mJ/cm$^2$ through the glass stamper 19. Thus, each of the plurality of microcapsules 52 is fixed in the deformed shape, namely substantially in the shape of a rectangular parallelepiped, whereby a third CLC-MC layer 33 is completed. At this time, the plurality of microcapsules 53 of the third CLC-MC layer 33 are arranged in a close-packed structure, and thus the LCD device 10 has a satisfactory aperture ratio.

Since the water-soluble photocurable resin is photo-cured, the cured water-soluble photocurable resin fills small gaps in the third CLC-MC layer 33, thereby insulating the second selection electrode 42 from a third data electrode 23 to be formed on the third CLC-MC layer 33.

Then, the third data electrode 23 is formed on the third CLC-MC layer 33. The third data electrode 23 is formed with a thickness of, e.g., about 1.5 μm by a printing method by using a conductive resin mixed with black carbon. Mixing the conductive resin with the black carbon can eliminate the step of applying a black paint or the like to the electrode after the electrode is formed. Note that the third data electrode 23 may be formed by an inkjet method.

Thereafter, for example, an epoxy resin, a urethane resin, or the like is screen printed on the third data electrode 23 and around the banks 12, 13, 15 to form a protective film 16.

Subsequently, common lines for extended portions 41', 42' of the first and second selection electrodes 41, 42 and for extended portions 21', 22' of the first and second data electrodes 21, 22 are formed on the transparent substrate 11. Then, a drive IC 17 is placed on the common line 43 of the first and second selection electrodes 41, 42, and a drive IC is placed on the common line of the first and second data electrode 21, 22. A drive IC is also placed on an extended portion 23' of the third data electrode 23, which is formed on the side opposite to the extended portions 21', 22' of the first and second data electrodes 21, 22 on the transparent substrate 11.

Then, a connection circuit 18 is electrically connected to the common line 43 of the first and second selection electrodes 41, 42, thereby completing the LCD device 10 of FIG. 1.

(Driving Method of LCD Device 10)

A method for driving the LCD device 10 according to the first embodiment of the present invention will be described below.

The LCD device 10 is driven by sending external signals from the connection circuit 18 to each drive IC. When no voltage is applied to the first to third CLC-MC layers 31, 32, 33, the cholesteric liquid crystal contained in the microcapsules 51, 52, 53 is in a planar state and in a focal conic state.

The liquid crystal that is used in the present invention is cholesteric liquid crystal, namely chiral nematic liquid crystal containing a chiral material in nematic liquid crystal, and spontaneously has a helical structure. Application of a voltage can switch the cholesteric liquid crystal between the planar state where the helical structure is parallel to the direction in which the voltage is applied, and the focal conic state where the helical structure is vertical to the direction in which the voltage is applied. Since the cholesteric liquid crystal is stable in both states, the cholesteric liquid crystal is useful for memory LCD devices.

In the LCD device 10, every intersection of the first to third data electrodes 21, 22, 23, and the first and second selection electrodes 41, 42 forms a pixel. By sending signals from the drive ICs to the electrodes, a voltage (a bipolar pulse voltage) is applied to the CLC-MC layers, whereby the cholesteric liquid crystal contained in the microcapsules in the CLC-MC layers is switched between the planar state and the focal conic state, and thus the display state of each pixel is switched. The cholesteric liquid crystal contained in the microcapsules 51 in the first CLC-MC layer 31 is switched between the planar state and the focal conic state by a voltage applied from the first data electrode 21 and the first selection electrode 41. The cholesteric liquid crystal contained in the microcapsules 52 in the second CLC-MC layer 32 is switched between the planar state and the focal conic state by a voltage applied from the second data electrode 22 and the first selection electrode 41. The cholesteric liquid crystal contained in the microcapsules 53 in the third CLC-MC layer 33 is switched between the planar state and the focal conic state by a voltage applied from the third data electrode 23 and the second selection electrode 42.

In the planar state, the cholesteric liquid crystal contained in the microcapsules 51, 52, 53 selectively reflects light of a specific wavelength λ (λ=N×P) based on a helical pitch P and a refractive index N, and the selectively reflected light is circularly polarized light according to the helical axis. In the focal conic state, the cholesteric liquid crystal contained in the microcapsules 51, 52, 53 slightly scatters light at the boundaries of domains that are equal to or smaller than visible light wavelengths, but transmits most of light. Since the cholesteric liquid crystal spontaneously has a helical structure, neither an alignment process nor a polarizer is required like twisted nematic (TN) liquid crystal, super twisted nematic (STN) liquid crystal, or ferroelectric liquid crystal.

(Functions and Advantages)

Functions and advantages of the first embodiment of the present invention will be described below.

In the LCD device 10 of the first embodiment of the present invention, the first data electrode 21, the first CLC-MC layer 31, the first selection electrode 41, the second CLC-MC layer 32, the second data electrode 22, an intermediate layer (the insulating layer 14), the second selection electrode 42, the third CLC-MC layer 33, and the third data electrode 23 are sequentially formed in this order on the transparent substrate 11. Thus, the third CLC-MC layer 33 is interposed between the second selection electrode 42 and the third data electrode 23, and a voltage is applied to the third CLC-MC layer 33 by these electrodes. Accordingly, the third CLC-MC layer 33 is not driven by a data signal voltage for the second CLC-MC layer 32, which satisfactorily reduces display defects such as an unintended display state.

Second Embodiment

An LCD device 70 according to a second embodiment of the present invention will be described below.

Figure 12:
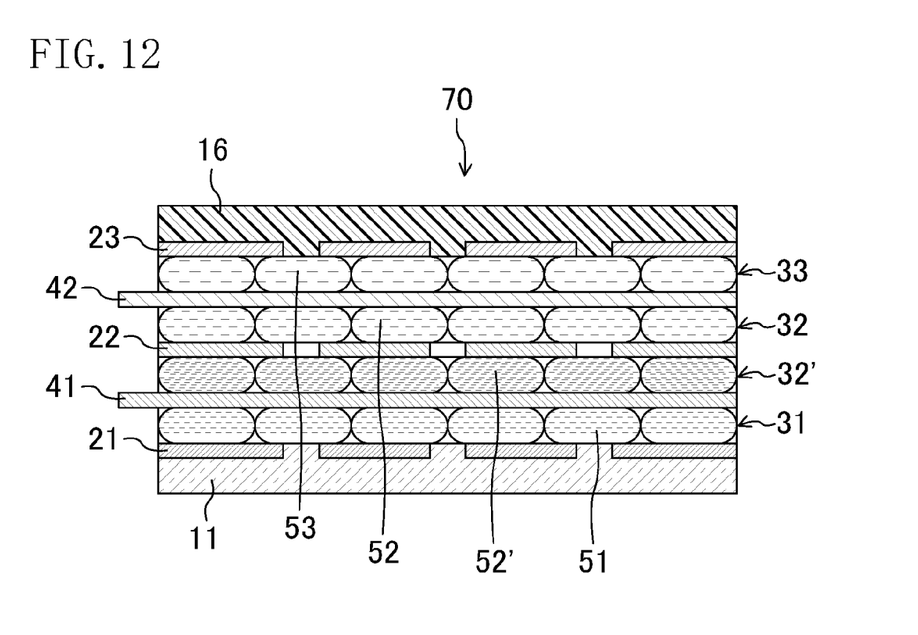
FIG. 12 is a cross-sectional view of an LCD device according to a second embodiment of the present invention.

FIG. 12 schematically shows a cross section of the LCD device 70 according to the second embodiment of the present invention. The LCD device 70 is different from the LCD device 10 of the first embodiment in that the insulating layer 14 is replaced with a second' CLC-MC layer 32' including microcapsules 52'.

The second' CLC-MC layer 32' has the same selective reflection wavelength as that of the second CLC-MC layer 32, and rotates the plane of polarization of selectively reflected light in a direction opposite to that of the second CLC-MC layer 32. A second selection electrode 42 is a red light transmitting electrode. More specifically, the second selection electrode 42 is made of a transparent conductive polymer material having a red dye dispersed therein. The second selection electrode 42 may be formed by interposing a resin, which has a red dye dispersed therein, between layers of a transparent conductive polymer material.

In the second embodiment, microcapsules, which contain cholesteric liquid crystal having a helical axis different from that of the cholesteric liquid crystal used in the first embodiment, may be used to form the CLC-MC layers to increase the light reflectance.

A first selection electrode 41 may be made of a transparent conductive polymer doped with a yellow dye, in order to reduce the wavelength range of green selective reflection and to increase color purity.

(Functions and Advantages)

Functions and advantages of the second embodiment of the present invention will be described below.

In the LCD device 70 of the second embodiment of the present invention, the second' CLC-MC layer 32', which has the same selective reflection wavelength as that of the second CLC-MC layer 32, and rotates the plane of polarization of selectively reflected light in a direction opposite to that of the second CLC-MC layer 32, is provided for the second CLC-MC layer 32 with the second data electrode 22 interposed therebetween. Thus, the LCD device 70 has two layers that selectively reflect green light, and thus has increased green light reflectance. Moreover, since the second selection electrode 42 is a red light transmitting electrode, the color purity of the third CLC-MC layer 33 is increased.

INDUSTRIAL APPLICABILITY

The present invention is useful for LCD devices that are used in, e.g., electronic inventory tags, information boards, electronic books, electronic paper, timetables, e-POP, or the like, and other memory LCD devices that are used in LCDs, and driving methods thereof.

The invention claimed is:

1. An LCD device, comprising:
a liquid crystal layer formed by laminating a plurality of layers (hereinafter referred to as CLC-MC layers) each formed by microcapsules containing cholesteric liquid crystal; and
a transparent substrate, wherein
a first data electrode, a first CLC-MC layer, a first selection electrode, a second CLC-MC layer, a second data electrode, an intermediate layer, a second selection electrode, a third CLC-MC layer, and a third data electrode are sequentially formed in this order on the transparent substrate, wherein
the first selection electrode and the second selection electrode are electrically connected to one drive IC, and
the first to third data electrodes are electrically connected to different drive ICs.

2. The LCD device of claim 1, wherein
of the first to third CLC-MC layers, the first CLC-MC layer has a shortest selective reflection wavelength and selectively reflects blue light, the second CLC-MC layer has a second shortest selective reflection wavelength and selectively reflects green light, and the third CLC-MC layer has a longest selective reflection wavelength and selectively reflects red light, and
the intermediate layer is an insulating layer that transmits light from the third CLC-MC layer therethrough, and does not transmit light from the second CLC-MC layer therethrough.

3. The LCD device of claim 1, wherein
the intermediate layer is a second' CLC-MC layer that has a same selective reflection wavelength as that of the second CLC-MC layer, and rotates a plane of polarization of selectively reflected light in a direction opposite to that of the second CLC-MC layer.

4. The LCD device of claim 3, wherein
the second selection electrode is a red light transmitting electrode.

5. The LCD device of claim 4, wherein
the second selection electrode is made of a transparent conductive polymer material having a red dye dispersed therein.

6. The LCD device of claim 5, wherein
the second selection electrode is formed by interposing a resin, which has a red dye dispersed therein, between layers of a transparent conductive polymer material.

7. The LCD device of claim 1, wherein
each of the first and second selection electrodes is formed by stripe electrodes so that the stripe electrodes of the first and second electrodes extend in a same direction, and
each of the first to third data electrodes is formed by stripe electrodes so that the stripe electrodes of the first to third data electrodes extend in a same direction that crosses the first and second selection electrodes.

8. The LCD device of claim 1, wherein
the cholesteric liquid crystal of each of the first to third CLC-MC layers has positive dielectric anisotropy.

9. The LCD device of claim 1, wherein
the transparent substrate is a plastic substrate.

10. The LCD device of claim 1, wherein
the first data electrode is made of an inorganic transparent conductive material.

11. The LCD device of claim 1, wherein
each of the first and second selection electrodes and the second and third data electrodes is made of a conductive polymer material.

12. The LCD device of claim 1, wherein
the third data electrode is made of carbon black.

13. The LCD device of claim 1, wherein
the third data electrode is covered by a protective film.

14. The LCD device of claim 13, wherein
the protective film is made of a black material.

15. The LCD device of claim 13, wherein
the protective film has a black paint applied to its surface.

16. The LCD device of claim 13, wherein
the protective film has a black film provided on its surface.

17. The LCD device of claim 13, wherein
the protective film is dark blue, and has a black paint applied to its surface.

18. The LCD device of claim 13, wherein
the protective film is dark blue, and has a black film provided on its surface.

19. The LCD device of claim 1, wherein
the first selection electrode is made of green polyaniline.

20. An LCD device, comprising:
a liquid crystal layer formed by laminating a plurality of layers (hereinafter referred to as CLC-MC layers) each formed by microcapsules containing cholesteric liquid crystal; and
a transparent substrate, wherein
a first data electrode, a first CLC-MC layer, a first selection electrode, a second CLC-MC layer, a second data electrode, an intermediate layer, a second selection electrode, a third CLC-MC layer, and a third data electrode are sequentially formed in this order on the transparent substrate, wherein
each of the first and second selection electrodes is formed by stripe electrodes so that the stripe electrodes of the first and second electrodes extend in a same direction, and
each of the first to third data electrodes is formed by stripe electrodes so that the stripe electrodes of the first to third data electrodes extend in a same direction that crosses the first and second selection electrodes.

21. An LCD device, comprising:
a liquid crystal layer formed by laminating a plurality of layers (hereinafter referred to as CLC-MC layers) each formed by microcapsules containing cholesteric liquid crystal; and
a transparent substrate, wherein
a first data electrode, a first CLC-MC layer, a first selection electrode, a second CLC-MC layer, a second data electrode, an intermediate layer, a second selection electrode, a third CLC-MC layer, and a third data electrode are sequentially formed in this order on the transparent substrate, wherein
the third data electrode is covered by a protective film, wherein
the protective film is made of a black material.

* * * * *